(No Model.)
B. LIGGET.
RAIN WATER FILTER.
No. 342,616. Patented May 25, 1886.
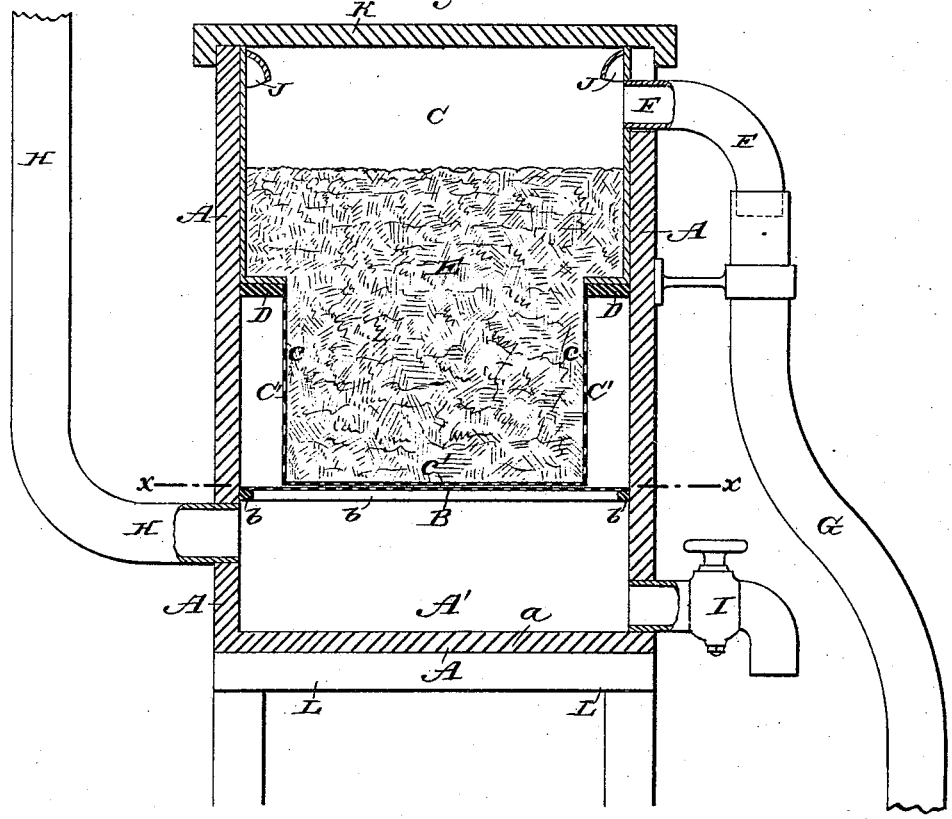
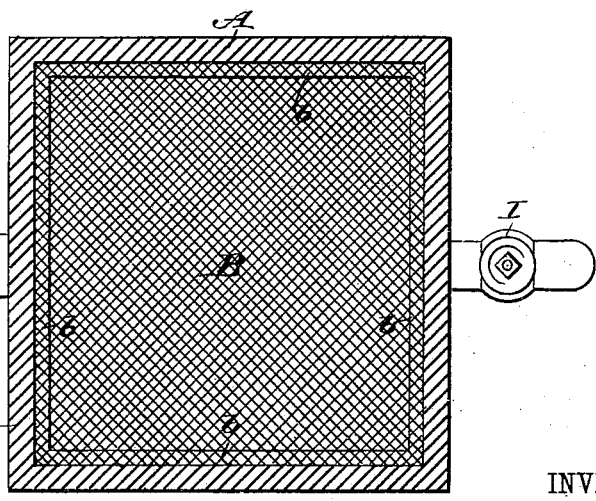
WITNESSES:
INVENTOR:
B. Ligget
BY Munn & Co
ATTORNEYS.

United States Patent Office.

BENJAMIN LIGGET, OF TUCSON, ARIZONA TERRITORY.

RAIN-WATER FILTER.

SPECIFICATION forming part of Letters Patent No. 342,616, dated May 25, 1886.

Application filed November 2, 1885. Serial No. 181,648. (No model.)

*To all whom it may concern:*

Be it known that I, BENJAMIN LIGGET, of Tuscon, in the county of Pima and Territory of Arizona, have invented a new and Improved Rain-Water Filter, of which the following is a full, clear, and exact description.

My invention relates to filters adapted to purify rain water flowing from the roofs of buildings and conduct it to a cistern or storage-reservoir; and the invention has for its object to provide a simple inexpensive filter which shall accomplish its work effectively by preventing the passage of decomposable matters into the cistern.

The invention consists of the combinations of parts, including their construction, substantially as hereinafter set forth, and pointed out in the claims.

Reference is to be had to the accompanying drawings, forming a part of this specification, in which similar letters of reference indicate corresponding parts in both the figures.

Figure 1 is a vertical sectional elevation of my improved rain-water filter with the attached leader and discharge-pipes partly in section; and Fig. 2 is a sectional plan view taken on the line $x\ x$, Fig. 1.

The letter A indicates the main tank or vessel of the filter, and which I show in square general form, but which may have a round or other form, as desired, and may have any required capacity.

Near the bottom $a$ of the tank A is placed a perforated false bottom, B, which may be fastened to or may rest loosely upon cleats $b$, fixed to the tank A.

On the false bottom B is placed or supported the filtering vessel or filter proper, C, which is made smaller in size at its lower portion, C', than at its top part, which latter snugly fits the tank A, and a packing, as at D, may be fixed to the filter C, so as to fit water-tight against the side walls of the tank A, to prevent the water from rising in the tank above the contracted lower portion, C', of the filter C, and consequently compel the water to pass through the perforated sides and bottom $c\ c'$ of the part C' of the filter into the interior of the filter, which will be provided with sand, charcoal, or any other suitable filtering substance, E, through which the water will pass on its way to the discharge-spout F of the filter, which is connected to the pipe G, which leads to the cistern or storage-reservoir for the filtered rain-water. The rain-water is admitted to the filter through the pipe H, which connects at its upper end with the gutter at the roof of a building, and at its lower end opens into the lower compartment, A', of the tank A below the false bottom B.

A suitable faucet, I, or it may be a plug of any kind, is fitted into the side of the tank A, next its bottom, so that the contents of the filter may pass or may be washed out through said faucet I, as presently described.

I show the filter C provided with handles J, by which it may be lifted from the tank A when tank-cover K is removed, for allowing renewal of the filtering material E, or for access to the false bottom B or to the interior of the tank A.

The filter as a whole may be supported on any suitable frame, L, conveniently located to allow connection of the filter with the leader.

The operation is as follows: When the water first flows into the compartment A' of the tank A from the leader H, the faucet I will be opened for a short time, to allow the first of the rain-water which had washed the roof to pass out of the filter and go to waste, and when the water is comparatively clear the faucet I will be closed, and the water entering the tank A then will flow upward through the false bottom B and through the lower part, C', of the filter-vessel C, and through the filtering substance E therein, and thence to and through the spout F into the pipe G and to the cistern, which latter is not shown in the drawings. It is evident that by admitting the water from the roof at the bottom of the filter and causing the water to be purified as it rises through the filter all leaves or filth of any kind carried into the filter with the water will be held back by the perforated bottom or strainer B, or the filter proper, C, and when the rain is over the faucet I may be opened to allow the leaves, filth, or sedimentary matters to be discharged through it, as the whole interior of the filter is rinsed or washed out by the downward flow through it of the water which it holds, and the filter then is clean and ready for the next rain. Consequently all decomposable matters are washed from the filter and cannot be washed into the cistern by the next rain, as often occurs with filters which receive the rain-water at the top and hold back substances, so that they decompose, as will be readily understood. The water passing through the filter may be purified to any desired degree, and as will depend on the nature of the filtering substance E placed in the filter; or, if desired, the filter C E may be removed and a double-elbow pipe be placed so its one end reaches into the tank A and its other end connects with the pipe G, and in this case the rain-water will simply be strained by the perforated false bottom B to be fixed in tank.

By connecting a funnel to the pipe H the filter may be used to purify any liquid, as will readily be understood.

Having thus described my invention, I claim as new and desire to secure by Letters Patent—

1. In a rain-water filter, the combination, with the tank or receptacle having the inlet or leader pipe connected to its lower part and the discharge-pipe connected to the upper part, of the filter having the upper enlarged part fitting closely the said tank or receptacle and the perforated contracted part arranged to provide a water-space between the same and the said tank or receptacle, substantially as and for the purpose set forth.

2. In a rain-water filter, the combination, with the tank or receptacle having the inlet or leader pipe connected to its lower part and the discharge-pipe connected to its upper part, of the filter having the upper enlarged part fitting closely the said tank or receptacle and the perforated contracted part arranged to provide a water-space between the same and the tank or receptacle, the offset bottom portion between the upper and lower parts of the filter being packed water-tight, and the perforated false bottom supporting the said filter, substantially as and for the purpose set forth.

BENJAMIN LIGGET.

Witnesses:
W. K. MEADE,
W. A. ZABRESKIE.